US011917326B2

(12) United States Patent
Teruuchi

(10) Patent No.: US 11,917,326 B2
(45) Date of Patent: *Feb. 27, 2024

(54) RECORDING REPRODUCTION APPARATUS, RECORDING REPRODUCTION METHOD, AND NON-TRANSITORY COMPUTER READABLE MEDIUM

(71) Applicant: JVCKENWOOD Corporation, Kanagawa (JP)

(72) Inventor: Takuji Teruuchi, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 19 days.

This patent is subject to a terminal disclaimer.

(21) Appl. No.: 17/727,693

(22) Filed: Apr. 22, 2022

(65) Prior Publication Data

US 2022/0256110 A1 Aug. 11, 2022

Related U.S. Application Data

(63) Continuation of application No. 17/173,014, filed on Feb. 10, 2021, now Pat. No. 11,343,462, which is a (Continued)

(30) Foreign Application Priority Data

Sep. 10, 2018 (JP) .................................. 2018-168587

(51) Int. Cl.
*H04N 5/77* (2006.01)
*B60R 11/02* (2006.01)
(Continued)

(52) U.S. Cl.
CPC ........... *H04N 5/77* (2013.01); *B60R 11/0229* (2013.01); *G07C 5/085* (2013.01); *H04N 7/181* (2013.01); *H04N 23/90* (2023.01); *G08G 1/0137* (2013.01)

(58) Field of Classification Search
CPC ................... B60R 1/00; B60R 11/0229; B60R 2011/0026; B60R 11/0235; B60R 11/04;
(Continued)

(56) References Cited

U.S. PATENT DOCUMENTS 9,117,352 B2\* 8/2015 Yoshida ............. G08B 13/1427
2004/0204840 A1\* 10/2004 Hashima ............ G01C 21/3688
701/526
(Continued)

FOREIGN PATENT DOCUMENTS

JP 2002-117496 A 4/2002
JP 2008-140334 A 6/2008
JP 2009-087007 A 4/2009

*Primary Examiner* — Thai Q Tran
*Assistant Examiner* — Stephen R Smith
(74) *Attorney, Agent, or Firm* — Procopio, Cory, Hargreaves & Savitch LLP

(57) ABSTRACT

A recording reproduction apparatus according to the present disclosure includes: a captured data acquisition unit that acquires first captured data captured by a first camera that captures an image of an outside of a vehicle; an event detection unit that detects an event regarding the vehicle; a recording controller that stores the first captured data in a period including at least a timing of occurrence of the event as event recording data; a reproduction controller that reproduces the event recording data; a display controller that causes a display unit to display the event recording data reproduced by the reproduction controller; and an attachment/detachment detection unit that detects an attachment/detachment state of the display unit to/from the vehicle, in which the reproduction controller starts, when it has been detected by the attachment/detachment detection unit that the display unit has been detached from the vehicle, reproduction of event recording data.

7 Claims, 11 Drawing Sheets

Related U.S. Application Data continuation of application No. PCT/JP2019/018498, filed on May 9, 2019.

(51) Int. Cl.
*G07C 5/08* (2006.01)
*H04N 7/18* (2006.01)
*H04N 23/90* (2023.01)
*G08G 1/01* (2006.01)

(58) Field of Classification Search
CPC .......... B60R 2011/0049; G07C 5/085; G07C 5/0866; G07C 5/00; H04N 7/181; H04N 23/90; H04N 23/63; H04N 7/188; H04N 5/23293; H04N 5/247; H04N 5/77; G08G 1/0137
USPC ............ 348/32, 148, 143; 701/1, 146, 526
See application file for complete search history.

(56) References Cited

U.S. PATENT DOCUMENTS

| | | | |
|---|---|---|---|
| 2006/0133476 A1 | 6/2006 | Page | |
| 2008/0133088 A1* | 6/2008 | Yamada | G07C 5/0891 701/46 |
| 2010/0085193 A1* | 4/2010 | Boss | H04N 5/76 340/573.1 |
| 2010/0171829 A1* | 7/2010 | Yago | G07C 5/0858 348/143 |
| 2015/0015706 A1* | 1/2015 | Hatori | B60R 1/00 348/148 |
| 2015/0105934 A1* | 4/2015 | Palmer | B60R 1/00 701/1 |
| 2016/0286156 A1* | 9/2016 | Kovac | F41C 33/029 |
| 2017/0341611 A1* | 11/2017 | Baker | B60R 25/305 |
| 2018/0072226 A1* | 3/2018 | Bunch | B60R 1/00 |
| 2018/0336144 A1* | 11/2018 | Olarig | H04N 5/772 |
| 2019/0172218 A1* | 6/2019 | Maruoka | B60K 35/00 |
| 2019/0227409 A1* | 7/2019 | Grant | H04N 5/2252 |
| 2019/0253672 A1* | 8/2019 | Pflug | G06F 3/04883 |

\* cited by examiner

RECORDING REPRODUCTION APPARATUS, RECORDING REPRODUCTION METHOD, AND NON-TRANSITORY COMPUTER READABLE MEDIUM

CROSS REFERENCE TO RELATED APPLICATION

This application is a Continuation of U.S. application Ser. No. 17/173,014 filed on Feb. 10, 2021, which is a Bypass Continuation based on PCT Application No. PCT/JP2019/018498 filed on May 9, 2019, which is based upon and claims the benefit of priority from Japanese patent application No. 2018-168587 filed on Sep. 10, 2018, the disclosure of which is incorporated herein in its entirety by reference.

BACKGROUND

Dashboard cameras that detect an impact on a vehicle and store video images for a predetermined period of time before and after a timing when the impact has been detected as event recording data in such a way that this data is not overwritten have become widespread. For example, Japanese Unexamined Patent Application Publication No. 2009-087007 discloses a dashboard camera that records video data based on transition of acceleration.

SUMMARY

In many dashboard cameras including the aforementioned dashboard camera disclosed in Japanese Unexamined Patent Application Publication No 2009-087007, in order to reproduce event recording data stored when an event occurring due to an accident or the like is detected for the purpose of checking the circumstances of the accident, it is required to operate the dashboard camera, select the event recording data, which is the target to be reproduced, and perform an operation of reproducing the corresponding data. Alternatively, it is required to remove a memory card or the like that stores event recording data recorded by the dashboard camera and to reproduce the corresponding data in another apparatus.

It is possible, however, the event recording data may not be appropriately reproduced when the circumstances of the accident are checked such as in a case in which the user of the dashboard camera does not know the functions of the dashboard camera very well or the user is distracted by the accident.

A recording reproduction apparatus according to this embodiment includes: a captured data acquisition unit configured to acquire first captured data captured by a first camera that captures an image of an outside of a vehicle; an event detection unit configured to detect an event regarding the vehicle; a recording controller configured to store, when the event detection unit has detected an event, the first captured data in a period including at least a timing of occurrence of the event that has been detected as event recording data; a reproduction controller configured to reproduce the event recording data stored in the recording controller; a display controller configured to cause a display unit to display the event recording data reproduced by the reproduction controller; and an attachment/detachment detection unit configured to detect an attachment/detachment state of the display unit to/from the vehicle, in which the reproduction controller starts, when it has been detected by the attachment/detachment detection unit that the display unit has been detached from the vehicle, reproduction of event recording data.

A recording method according to this embodiment includes: a captured data acquisition step for acquiring first captured data captured by a first camera that captures an image of an outside of a vehicle; an event detection step for detecting an event regarding the vehicle; a recording step for storing, when an event has been detected in the event detection step, the first captured data in a period including at least a timing of occurrence of the event that has been detected as event recording data; an attachment/detachment detection step for detecting an attachment/detachment state of a display unit that displays video images to/from the vehicle; a reproduction step for starting, when it has been detected in the attachment/detachment detection step that the display unit has been detached from the vehicle, reproduction of the event recording data stored in the recording step; and a display step for causing the display unit to display event recording data reproduced in the reproduction step.

A non-transitory computer readable medium storing a program according to this embodiment causes a computer operating as a recording reproduction apparatus to execute the following steps of: a captured data acquisition step for acquiring first captured data captured by a first camera that captures an image of an outside of a vehicle; an event detection step for detecting an event regarding the vehicle; a recording step for storing, when an event has been detected in the event detection step, the first captured data in a period including at least a timing of occurrence of the event that has been detected as event recording data; an attachment/detachment detection step for detecting an attachment/detachment state of a display unit that displays video images to/from the vehicle; a reproduction step for starting, when it has been detected in the attachment/detachment detection step that the display unit has been detached from the vehicle, reproduction of the event recording data stored in the recording step; and a display step for causing the display unit to display event recording data reproduced in the reproduction step.

According to this embodiment, it is possible to easily reproduce event recording data and check the reproduced event recording data.

DETAILED DESCRIPTION

In the following description, with reference to the drawings, embodiments of the present disclosure will be explained. While the descriptions will be given taking an example of a dashboard camera used in an automobile, which is a vehicle, as an example of a recording reproduction apparatus according to the embodiments in the following description, the present disclosure is not limited thereto. The present disclosure can be applied also to, for example, various types of moving bodies such as vehicles like motorcycles or automobiles, railroads, ships, robots, and persons. Further, the present disclosure is not limited by the following embodiments.

Hereinafter, with reference to FIGS. 1 to 5, a first embodiment of the present disclosure will be described. A recording reproduction apparatus 10 according to the first embodiment is mounted above a windshield of a vehicle as a dashboard camera in such a way that it can capture images of the front side of the vehicle, detects an impact that corresponds to a phenomenon such as an accident that should be detected as an event, and stores captured data during a period including a timing when an accident has occurred as event recording data. The recording reproduction apparatus 10 which serves as the dashboard camera is not limited to the one mounted on a vehicle as a single apparatus and may be applicable also to a configuration in which it is provided as a function of a navigation device or a configuration in which it is mounted on a vehicle in advance.

Figure 1:
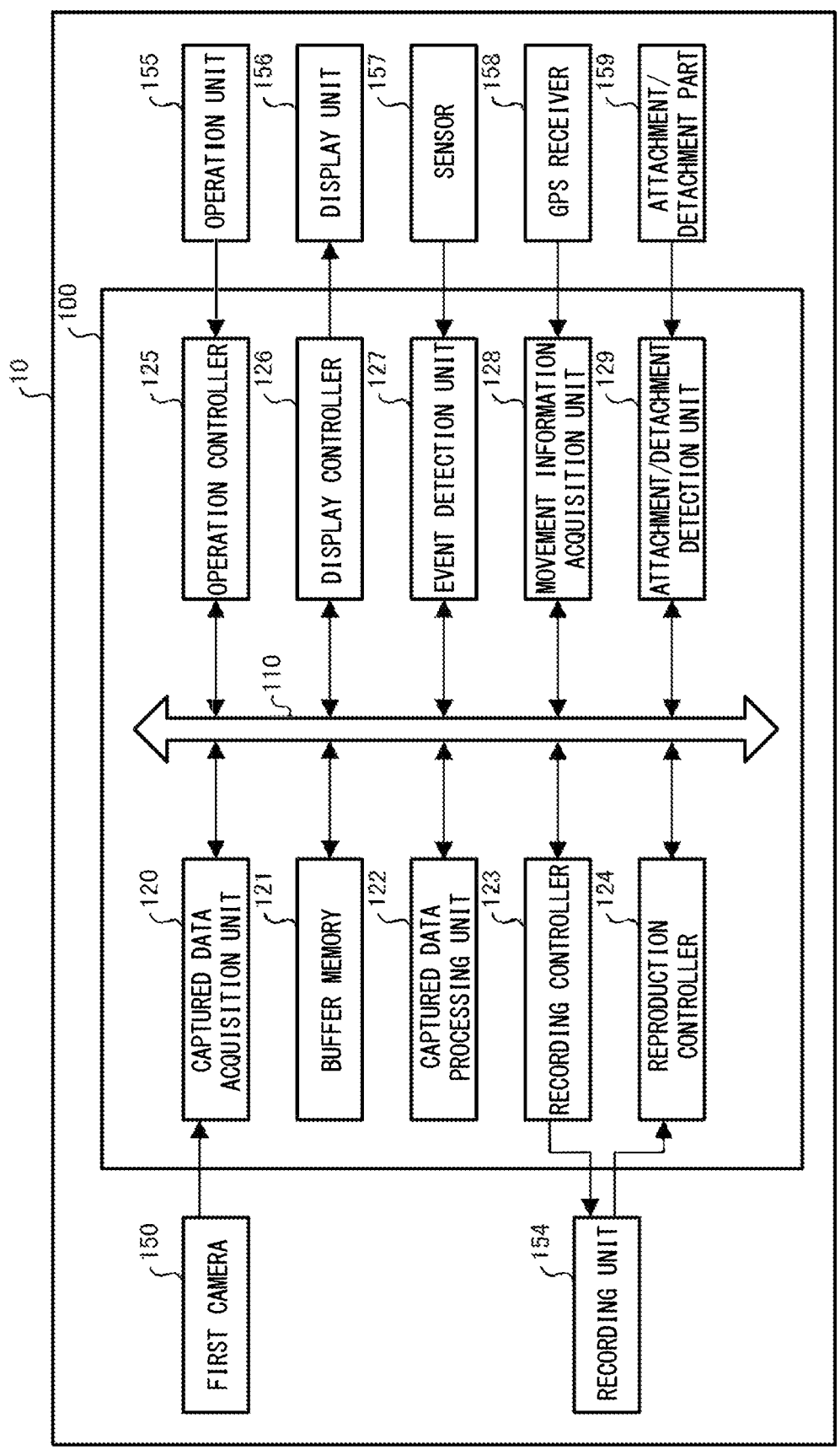
FIG. 1 is a block diagram showing a configuration of a recording reproduction apparatus according to a first embodiment of the present disclosure.

FIG. 1 is a block diagram showing a configuration of a recording reproduction apparatus 10 according to the first embodiment of the present disclosure. In FIG. 1, the recording reproduction apparatus 10 includes a controller 100, which serves as a recording reproduction control apparatus, a first camera 150, a recording unit 154, an operation unit 155, a display unit 156, a sensor 157, a Global Positioning System (GPS) receiver 158, and an attachment/detachment part 159.

While the recording reproduction apparatus 10 is mounted on the vehicle in such a way that the capturing direction of the first camera 150 that captures an outside of the vehicle is directed to the front side of the vehicle, it may be mounted on the vehicle in such a way that the capturing direction of the first camera 150 is directed to the back side or the lateral side of the vehicle. Further, the recording reproduction apparatus 10 may be an integrated apparatus or may be provided in a plurality of apparatuses in a dispersed manner. Further, while the description of a power supply or the like for operating the recording reproduction apparatus 10 is omitted in the description regarding FIG. 1, the recording reproduction apparatus 10 operates by power supplied from the vehicle and includes a battery (not shown) therein. When power is not supplied from the vehicle, the recording reproduction apparatus 10 operates by power from the battery.

Figure 2A:
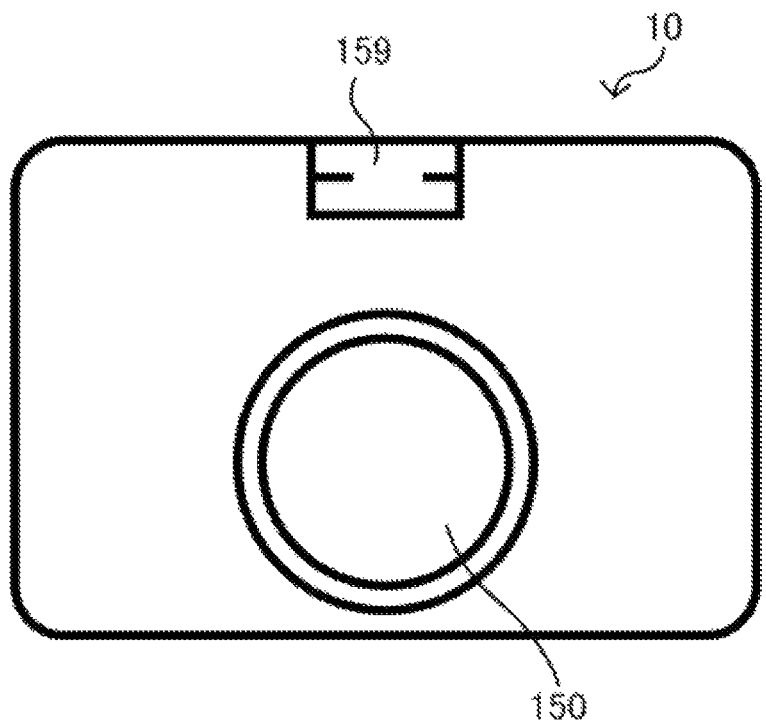
FIG. 2A is a diagram showing the exterior of the recording reproduction apparatus according to the first embodiment of the present disclosure.
Figure 2B:
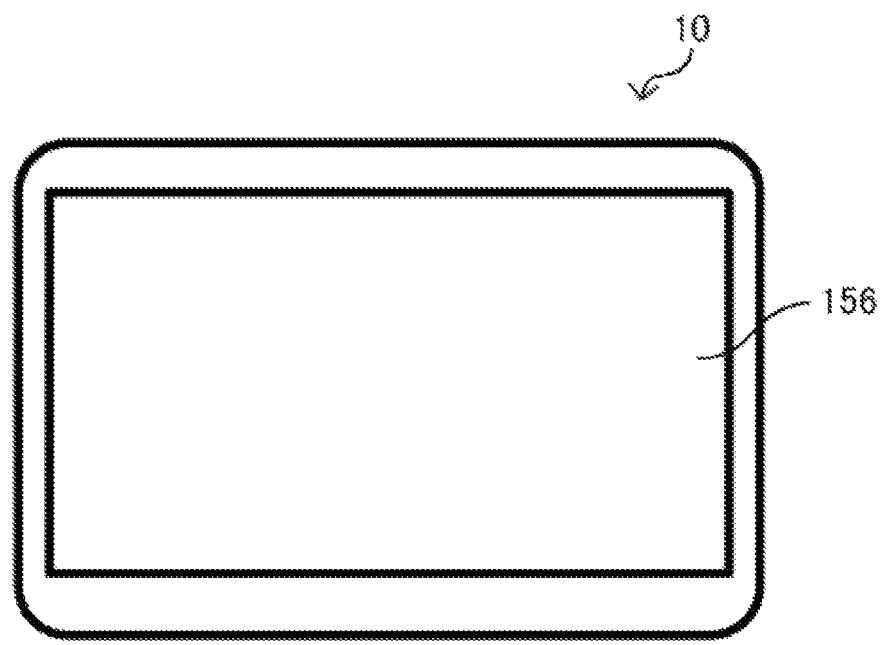
FIG. 2B is a diagram showing the exterior of the recording reproduction apparatus according to the first embodiment of the present disclosure.
Figure 2C:
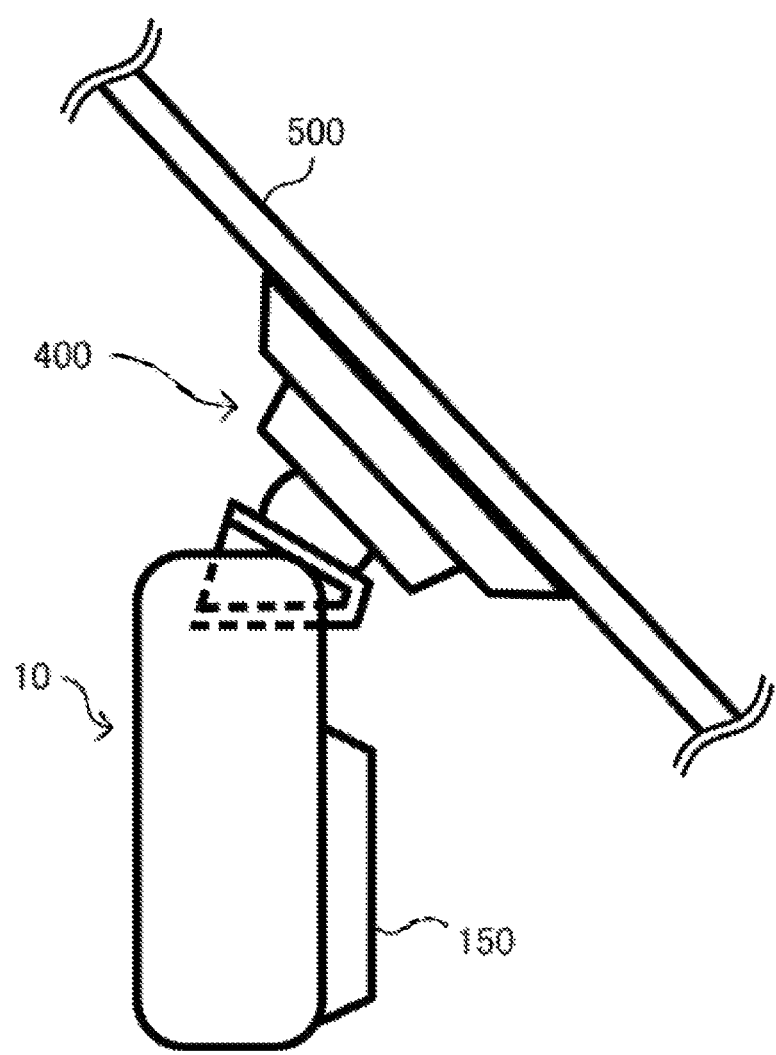
FIG. 2C is a diagram showing the exterior of the recording reproduction apparatus according to the first embodiment of the present disclosure.

FIGS. 2A-2C are diagrams each showing the exterior of the recording reproduction apparatus 10 according to the first embodiment of the present disclosure. FIG. 2A is a front view when the recording reproduction apparatus 10 is seen from the direction in which an outside of the vehicle is captured. That is, FIG. 2A is a diagram of the recording reproduction apparatus 10 when it is seen from the front of the direction in which the first camera 150 captures images in FIGS. 2A-2C. FIG. 2B is a diagram of the recording reproduction apparatus 10 when it is seen from the back surface. FIG. 2C is a diagram of the recording reproduction apparatus 10 when it is seen from the lateral surface.

As shown in FIGS. 2A-2C, the recording reproduction apparatus 10 includes the first camera 150 that captures an outside of the vehicle, the display unit 156 that displays reproduced event recording data or the like, and the attachment/detachment unit 159 for causing the recording reproduction apparatus 10 to be mounted on the vehicle in such a way that the recording reproduction apparatus 10 can be attached to or detached from the vehicle. As shown in FIG. 2C, the recording reproduction apparatus 10 is attached to a windshield 500 or the like included in the vehicle using a bracket 400 or the like. In the example shown in FIG. 2C, the recording reproduction apparatus 10 is installed in such a way that it can capture images of an area including the front side of the vehicle via the windshield 500. The bracket 400, which includes a sucker, a ball joint or the like, can be attached to or detached from the attachment/detachment unit 159 of the recording reproduction apparatus 10.

When the recording reproduction apparatus 10 is mounted above the windshield 500 of the vehicle in such a way it is directed to the front side of the vehicle so as to capture images on the front side of the vehicle, the first camera 150 can capture images on the front side, which is an outside of the vehicle, via the windshield 500 of the vehicle, and the display surface of the display unit 156 is directed toward the cabin of the vehicle, in other words, toward the driver.

With reference once again to FIG. 1, the controller 100 is formed of one or a plurality of Central Processing Units (CPUs), Graphics Processing Units (GPUs), buffer memories 121 etc. that perform various types of data processing, and executes various kinds of processing by programs. The controller 100 at least includes, as its components and functions, a bus line 110, a captured data acquisition unit 120, a captured data processing unit 122, a recording controller 123, a reproduction controller 124, an operation controller 125, a display controller 126, an event detection unit 127, a movement information acquisition unit 128, and an attachment/detachment detection unit 129. In the following description, the components of the controller 100 are described to be the ones that exchange data such as captured data via the bus line 110.

The controller 100, which is a recording reproduction control apparatus that executes operations according to the present disclosure in the recording reproduction apparatus 10, executes a recording reproduction method according to the present disclosure. Further, the controller 100 is a computer that operates a program according to the present disclosure.

The first camera 150 captures images of an outside of the vehicle, which is a moving body. The first camera 150 may be integrated with the recording reproduction apparatus 10 or may be connected thereto as a separate component by a wire or wirelessly. Further, a unit including the first camera 150 and the captured data acquisition unit 120 may be connected thereto as a separate component by a wire or wirelessly. The first camera 150 includes a lens, an image-pickup element, an Analog to Digital (A-D) conversion element and the like, although they are not shown in the drawings. The first camera 150 outputs first captured data that has been captured to the captured data acquisition unit 120. The area captured by the first camera 150 is a desired area such as the front side or the back side of the vehicle and the first camera 150 may be an all-around camera.

While only one first camera 150 is provided in FIG. 1, the first camera 150 may be formed of a plurality of cameras. The first camera 150 may be, for example, a plurality of cameras of a desired combination of cameras that capture respective images of the front side, the back side, the lateral side, and inside the cabin of the vehicle.

The data captured by the first camera 150 is video data. The captured data may include, besides video data, audio data. In this case, the first camera 150 includes a microphone.

The recording unit 154, which is a non-volatile memory for recording the first captured data captured by the first camera 150 by control performed by the recording controller 123, is, for example, a memory card. The first captured data recorded in the recording unit 154 is reproduced by control of the reproduction controller 124. The recording unit 154 may be replaced by a separate recording reproduction apparatus including the recording controller 123 and the reproduction controller 124 in addition to the recording unit 154. The recording unit 154 may be integrated with the recording reproduction apparatus 10 or may be connected thereto as a separate component by a wire or wirelessly.

The operation unit 155, which is an interface that accepts an operation on the recording reproduction apparatus 10, outputs information on the accepted operation to the operation controller 125. The operation unit 155, which is various kinds of buttons or a touch panel, accepts an operation by the user. The operation unit 155 may accept an operation by another apparatus connected thereto wirelessly. The operation unit 155 accepts, for example, a user's operation of starting recording of an event. Further, the operation unit 155 accepts a user's operation of performing reproduction of the event recording data.

The display unit 156 is a display device that displays various kinds of information by control performed by the display controller 126. The display unit 156 includes a display panel such as a liquid crystal panel or an organic EL panel. The display unit 156 may be integrated with the recording reproduction apparatus 10 or may be connected thereto as a separate component by a wire or wirelessly. The display unit 156 may be another device that is connected wirelessly and includes the display controller 126.

The sensor 157, which is, for example, an acceleration sensor, detects acceleration applied to the recording reproduction apparatus 10 or the vehicle. The sensor 157, which is, for example, a three-axis acceleration sensor, detects acceleration applied in the front-back direction of the vehicle as the x-axis direction, the right-left direction of the vehicle as the y-axis direction, and the vertical direction of the vehicle as the z-axis direction. The sensor 157 outputs the information on the detected acceleration to the event detection unit 127. The sensor 157 may be integrated with the recording reproduction apparatus 10 or may be connected thereto as a separate component by a wire or wirelessly. Further, the sensor 157 may be a separate component as a unit that includes the sensor 157 and the event detection unit 127.

The GPS receiver 158 is a GPS antenna that receives signals from a GPS satellite. The GPS receiver 158 outputs the received signals to the movement information acquisition unit 128. The GPS receiver 158 may be integrated with the recording reproduction apparatus 10 or may be connected thereto as a separate component by a wire or wirelessly. Further, the GPS receiver 158 may be a separate component as another apparatus including the movement information acquisition unit 128.

The attachment/detachment part 159 is a component for allowing the recording reproduction apparatus 10 to be attached to the vehicle. For example, as shown in FIGS. 2A-2C, a part of the bracket 400 is fitted to the attachment/detachment unit 159, whereby the recording reproduction apparatus 10 is mounted on the vehicle in such a way that it can be attached to/detached from the vehicle. The attachment/detachment part 159 is configured in such a way that the attachment/detachment detection unit 129 is able to determine that the recording reproduction apparatus 10 has been detached from the vehicle. For example, when the recording reproduction apparatus 10 is attached to the vehicle, the state of a member that elastically fits a part of the bracket 400 that is fitted to the attachment/detachment unit 159 may be mechanically or electrically detected. Alternatively, when a configuration in which the recording reproduction apparatus 10 can be supplied with power from the vehicle by electrode parts included in the bracket 400 and the attachment/detachment unit 159 contacting each other when the bracket 400 and the attachment/detachment unit 159 are fitted to each other is employed, the attachment/detachment detection unit 129 may be configured to determine whether the recording reproduction apparatus 10 has been attached to/detached from the vehicle depending on the state of the power supply from the vehicle.

The captured data acquisition unit 120 acquires the first captured data captured by the first camera 150. The captured data acquisition unit 120 outputs the first captured data acquired from the first camera 150 to the buffer memory 121.

The buffer memory 121, which is an internal memory included in the controller 100, temporarily stores captured data for a certain period of time acquired by the captured data acquisition unit 120 while updating this captured data.

The captured data processing unit 122 converts captured data that the buffer memory 121 temporarily stores into, for example, a desired file format such as MP4 format, which is encoded by a codec having a desired system such as H.264 or MPEG-4 (Moving Picture Experts Group). The captured data processing unit 122 generates captured data generated as a file for a certain period of time from the captured data that the buffer memory 121 temporarily stores. As a specific example, the captured data processing unit 122 generates 60-second captured data generated as a file in the order of recording from the captured data that the buffer memory 121 temporarily stores. The captured data processing unit 122 outputs the generated captured data to the recording controller 123. Further, the captured data processing unit 122 outputs the generated captured data to the display controller 126. While the period of the captured data generated as a file is set to be 60 seconds as one example, this is merely one example.

The recording controller 123 performs control to cause the recording unit 154 to record the captured data filed by the captured data processing unit 122. In the period during which the event detection unit 127 does not detect an event, the recording controller 123 records the captured data filed by the captured data processing unit 122 in the recording unit 154 as the captured data that can be overwritten. When the recording capacity of the recording unit 154 has reached the upper limit, the recording controller 123 overwrites the captured data that can be overwritten recorded in the recording unit 154 with new overwrite data from a recording area where old captured data is recorded. The captured data recorded by the recording controller 123 in the recording unit 154 is the first captured data captured by the first camera 150.

Upon receiving information indicating that the event detection unit 127 has determined that an event has occurred, the recording controller 123 stores the first captured data in a predetermined period including the event occurrence timing as event recording data that is prohibited from being overwritten.

A desired method may be used as the method of storing the event recording data by the recording controller 123. For example, a write-protected flag is added to a header or a payload of a section in which overwriting is prohibited in the first captured data, and the event recording data is stored in the recording unit 154. Alternatively, the section in which overwriting is prohibited in the first captured data is stored in the overwriting prohibited area of the recording unit 154. Alternatively, the section in which overwriting is prohibited in the first captured data is transmitted to another apparatus, where the event recording data is stored.

The reproduction controller 124 performs control for reproducing the captured data recorded in the recording unit 154. The reproduction controller 124 reproduces, besides the captured data that has been recorded in the recording unit 154 and can be overwritten, the event recording data where overwriting is prohibited, and outputs the reproduced data to the display controller 126.

The reproduction controller 124 starts, based on the results of the detection by the attachment/detachment detection unit 129, reproduction of the event recording data that has been stored most recently, for example. The reproduction controller 124 further reproduces various types of captured data including the event recording data based on the reproduction instruction accepted by the operation unit 155.

The operation controller 125 acquires operation information that the operation unit 155 has accepted and outputs the operation instruction based on the operation information to each of the components. When the operation controller 125 has acquired an instruction for selecting various types of data, which are to be reproduced, from the operation unit 155, the operation controller 125 causes the reproduction controller 124 to select the file and the like recorded in the recording unit 154. When the operation controller 125 has acquired an instruction regarding reproduction of various types of data from the operation unit 155, the operation controller 125 causes the reproduction controller 124 to perform processing regarding reproduction. The instruction regarding reproduction of various types of data includes, for example, reproduction start, pause, reproduction stop, enlarged display, etc.

The display controller 126 performs control for causing the display unit 156 to display various types of information. The display controller 126 causes the display unit 156 to display, for example, first video data which is being captured by the first camera 150. Further, the display controller 126 causes the display unit 156 to display the event recording data stored in the recording unit 154 reproduced by the reproduction controller 124. Further, when the display unit 156 includes a touch panel function as the operation unit 155, the display controller 126 causes the display unit 156 to display an icon or the like for performing a touch operation.

The event detection unit 127 acquires the acceleration information detected by the sensor 157, which is an acceleration sensor, and determines that an event has been detected when acceleration that corresponds to an event has been detected. When the event detection unit 127 has determined that the event has been detected, the event detection unit 127 outputs information indicating that an event has been detected to the recording controller 123.

The event detection unit 127 determines whether the acceleration output from the sensor 157 corresponds to acceleration when a vehicle has collided with another object such as another vehicle and detects that the acceleration output from the sensor 157 as acceleration that corresponds to an event when it corresponds to the acceleration when the vehicle has collided with the other object such as the other vehicle. The acceleration that corresponds to an event may be weighted in each of the x-axis direction, the y-axis direction, and the z-axis direction. Further, acceleration that sharply rises may be detected as the acceleration that corresponds to the event.

The movement information acquisition unit 128 specifies, based on signals from a GPS satellite that the GPS receiver 158 has received, the current position for each time, and outputs the current positional information for each time to the recording controller 123. The movement information acquisition unit 128 specifies the latitude and the longitude as the current positional information. The movement information acquisition unit 128 may receive, besides signals from the GPS receiver 158, radio waves such as Wi-Fi (registered trademark), and specify the current position using positional information of an access point as well.

The attachment/detachment detection unit 129 detects the attachment/detachment state of the recording reproduction apparatus 10 with respect to the vehicle. When the configuration of the recording reproduction apparatus 10 is not an integrated one, the attachment/detachment detection unit 129 detects the attachment/detachment state of the housing including at least the display unit 156 with respect to the vehicle. Therefore, in other words, the attachment/detachment detection unit 129 detects the attachment/detachment state of the display unit 156 with respect to the vehicle. The attachment/detachment detection unit 129 outputs a signal indicating the attachment/detachment state of the housing including at least the display unit 156 that composes the recording reproduction apparatus 10 or a signal indicating that the recording reproduction apparatus 10 has been detached to the reproduction controller 124.

Figure 3:
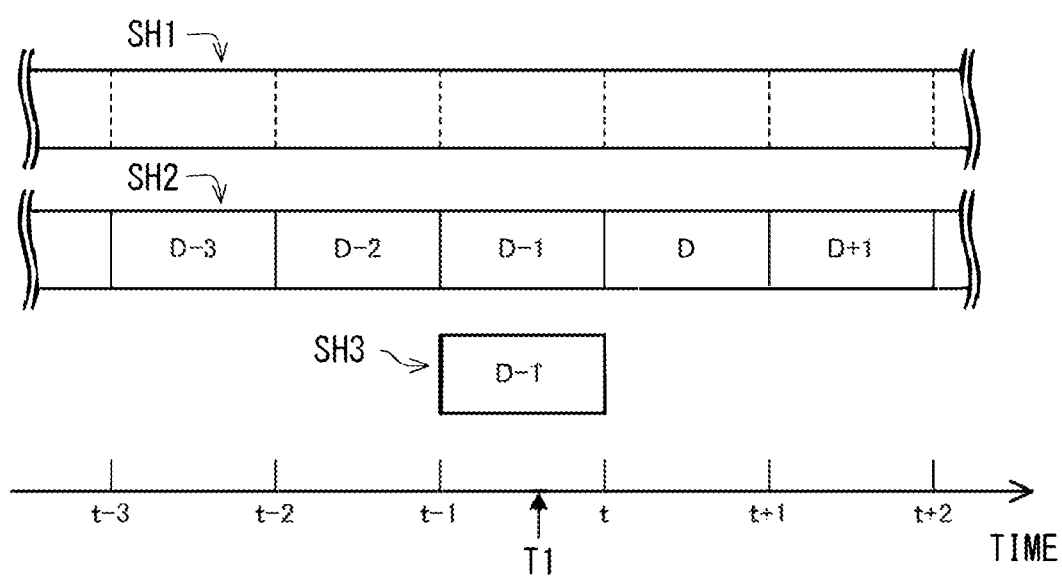
FIG. 3 is a diagram conceptually showing a relation between captured data and event recording data according to the first embodiment of the present disclosure.

Referring next to FIG. 3, a relation between the first captured data and the event recording data will be described. FIG. 3 is a diagram conceptually showing a relation between the captured data and the event data. The horizontal axis of FIG. 3 indicates the passage of time, and indicates that the time passes toward the right direction.

The symbol SH1 in FIG. 3 indicates the first captured data acquired from the first camera 150 by the captured data acquisition unit 120 and temporarily stored in the buffer memory 121. The dotted lines of SH1 in FIG. 3 correspond to time t−3 to time t+2 described in the time axis, and indicate the period for the captured data processing unit 122 to generate a file. Since a file has not yet been generated in the state in which the first captured data is temporarily stored in the buffer memory 121, the time is shown by the dotted lines.

The symbol SH2 in FIG. 3 indicates the first captured data obtained by filing, by the captured data processing unit 122, the first captured data temporarily stored in the buffer memory 121, and recorded, by the recording controller 123, in the recording unit 154. For example, captured data D-3, which is data captured between time t-3 and time t-2, is filed and recorded in the recording unit 154 in a state in which it can be overwritten. Likewise, captured data D-2, which is data captured between time t-2 and time t-1, is filed and recorded in the recording unit 154 in a state in which it can be overwritten.

When, for example, the recording capacity of the recording unit 154 has reached the upper limit, in the first captured data shown in SH2 in FIG. 3, the captured data is overwritten from the data that has been recorded at the earliest timing.

When, for example, an event has been detected at time T1, which is between time t-1 and time t, the first captured data in the period from a predetermined period of time before time T1, which is the event occurrence time, to a predetermined period of time after time T1 is stored as the event recording data. The predetermined period of time is, for example, but is not limited to, a period from 30 seconds before time T1, which is the event occurrence time, to 30 seconds after time T1.

As one example, when an event has been detected at time T1, which is between time t-1 and time t, the recording controller 123 stores captured data D-1 in the overwriting prohibited area of the recording unit 154 as event recording data D-1'.

When, for example, the recording capacity of the recording unit 154 has reached the upper limit, in the first captured data shown in SH2 in FIG. 3, the captured data D-1 is overwritten after the captured data D-2 is overwritten. However, the captured data D-1 is definitely stored since it is stored in the overwriting prohibited area of the recording unit 154 shown in SH3 in FIG. 3 as event recording data D-1'.

The first captured data in the period from time t-1 to time t is filed, and the event recording data D-1' stored in the overwriting prohibited area of the recording unit 154 is event recording data including time T1, which is time when the event has occurred. The event recording data is not limited to the first captured data in a period generated as a file including the event occurrence timing. The captured data in the period from a predetermined period of time before time T1, which is the event occurrence time, to a predetermined period of time after time T1 may be, for example, stored as the event recording data. The predetermined period of time is, for example, but is not limited to, 30 seconds.

Further, the storage of the event recording data is not limited to storage in the overwriting prohibited area of the recording unit 154. For example, the event recording data may be recorded in a recording unit included in another apparatus registered in advance using a communication function (not shown). As a specific example, the event recording data may be transmitted to a smartphone owned by a driver or a passenger that has been paired with the recording reproduction apparatus 10 in advance and has established communication with the recording reproduction apparatus 10. Alternatively, the event recording data may be transmitted to an apparatus such as a server owned by a driver, a person who has a relation with the driver, an insurance company, or a safety assurance company registered in the recording reproduction apparatus 10 in advance.

Each of the first captured data and the event recording data is preferably recorded in association with the positional information that the movement information acquisition unit 128 has acquired.

Figure 4:
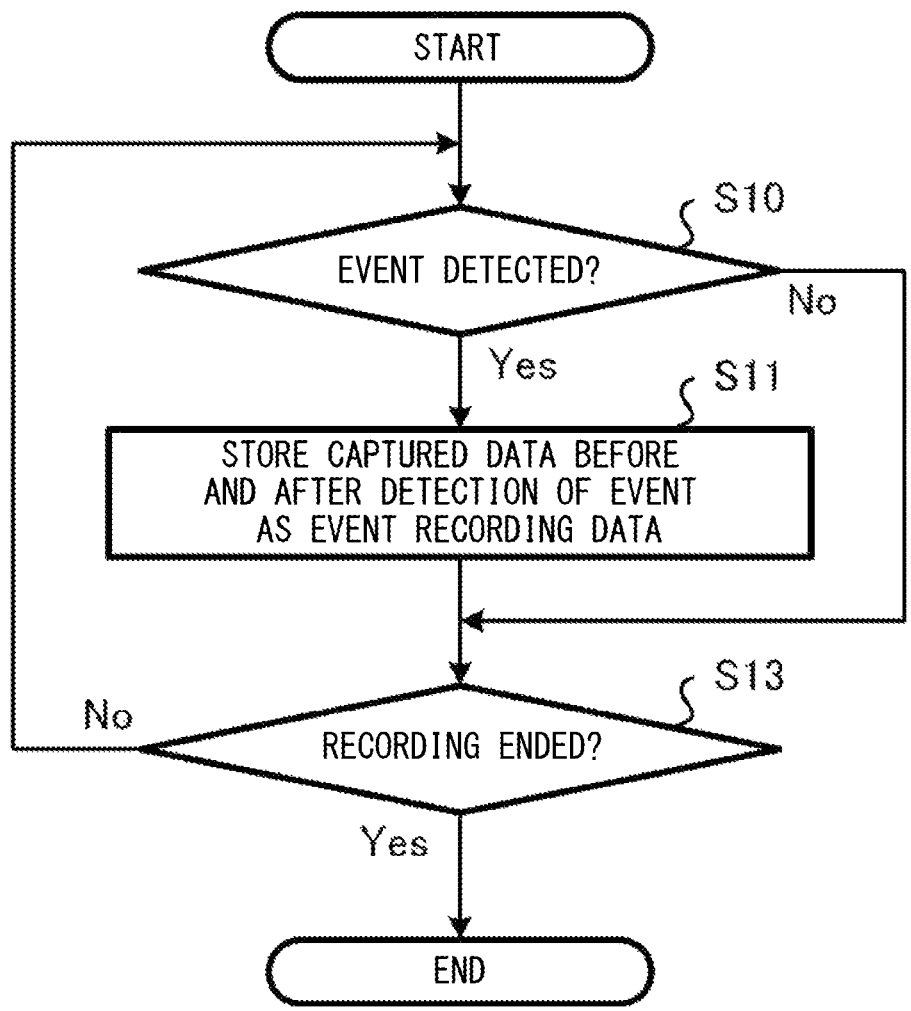
FIG. 4 is a flowchart showing a process example of the recording reproduction apparatus according to the first embodiment of the present disclosure.
Figure 5:
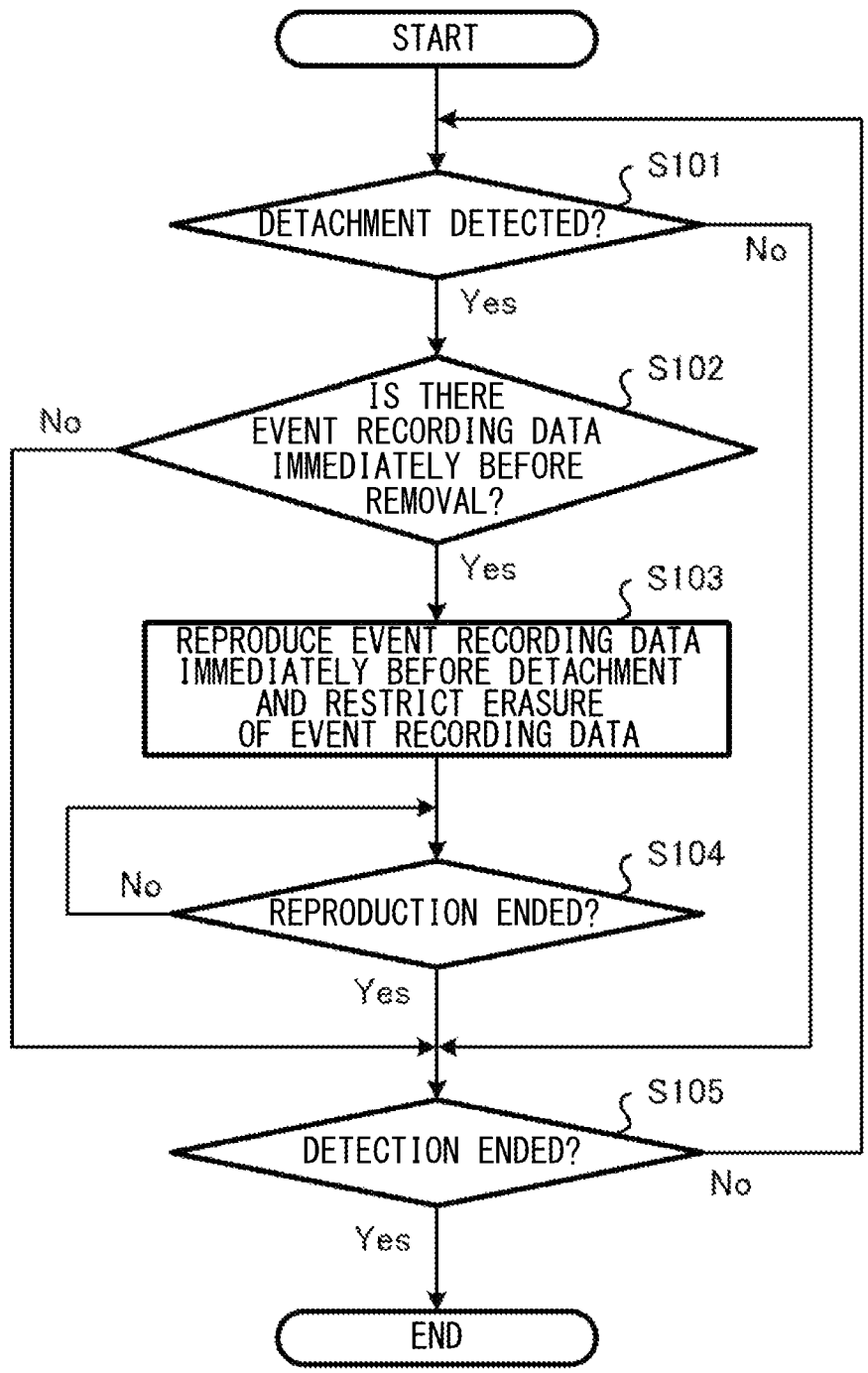
FIG. 5 is a flowchart showing a process example of the recording reproduction apparatus according to the first embodiment of the present disclosure.

Referring next to FIGS. 4 and 5, a flow of recording reproduction processing executed by the recording reproduction apparatus 10 will be explained. The recording reproduction processing executed by the recording reproduction apparatus 10 is executed by the controller 100, which is a computer operating as the recording reproduction apparatus 10, based on a program. The functions of the controller 100 may be executed by control apparatuses included in a plurality of apparatuses or a plurality of units in a dispersed manner. In this case, the program can also be executed in a cooperative manner for each apparatus or each unit.

FIG. 4 is a flowchart describing a case in which the recording reproduction apparatus 10 records events. In FIG. 4, the start and the end of the processing are not limited to the start and the end of a specific phenomenon. This is because the case in which the recording reproduction apparatus 10 detects an event includes, beside a case in which, for example, detection of an event is performed during an operation of a vehicle, which is a moving body, a case in which the vehicle, which is a moving body, is not operating and a case in which an event is detected by a so-called parking monitoring function. Further, the start and the end of the processing may be triggered by an instruction in the operation unit 155.

During the period in which the processing shown in FIG. 4 is being executed, the recording reproduction apparatus 10 performs recording of the captured data and detection of an event. The recording of the captured data is acquisition of the first captured data from the first camera 150 by the captured data acquisition unit 120, filing of the first captured data by the captured data processing unit 122, and execution of recording of the first captured data in the recording unit 154 by the recording controller 123. The first captured data in this case is recorded in the recording unit 154 in a state in which it can be overwritten, and this recording is also referred to as normal recording or loop recording. Further, the detection of the event means that the event detection unit 127 starts to acquire the acceleration information from the sensor 157 and the detection of the event is performed based on the acquired acceleration information.

While each of the processes shown in FIG. 4 is being executed, the recording of the first captured data, the detection of the event by acquisition of the acceleration information, and the specification of the current positional information by the movement information acquisition unit 128 are continuously executed.

In Step S10, the event detection unit 127 determines whether or not an event has been detected. The event detection unit 127 determines that the event has been detected when the acceleration detected by the sensor 157 is, for example, acceleration that corresponds to an accident such as a collision of an object with the vehicle. The acceleration that corresponds to a collision of an object with the vehicle may include a case in which the absolute value of the acceleration is equal to or larger than a predetermined threshold or a case in which the absolute value of the acceleration is equal to or larger than a predetermined threshold and the rising of this acceleration is sharp in a predetermined manner. Further, the event detection unit 127 may determine that an event has been detected when it has detected acceleration detected as an abnormal value such as sudden braking instead of the acceleration that corresponds to a collision of an object with respect to the vehicle.

When it is determined in Step S10 that the event has been detected (Step S10: Yes), the recording controller 123 stores the first captured data including the event occurrence timing detected in Step S10 as the event recording data (Step S11). The recording controller 123 stores the first captured data including the event occurrence timing in the overwriting prohibited area of the recording unit 154 as described in, for example, FIG. 3.

When it is determined in Step S10 that the event has not been detected (Step S10: No), the process proceeds to Step S13.

After the event recording data has been stored in Step S11 or it has been determined to be No in Step S10, the recording controller 123 determines whether or not the recording of the first captured data has ended (Step S13). When it is determined in Step S13 that the recording of the first captured data has ended (Step S13: Yes), this processing is ended. Further, when it is determined that the recording of the first captured data has not ended in Step S13 (Step S13: No), the processing proceeds to Step S10.

FIG. 5 is a flowchart describing a case in which the recording reproduction apparatus 10 performs reproduction of the event recording data. While the detachment detection period indicated by the start and the end of the processing in FIG. 5 is not limited to a period from the start to the end of a specific phenomenon such as an ON or OFF state of an engine, a power supply or the like of a vehicle, which is a moving body, it may be limited, for example, as follows. For example, the event recording data based on an event detected when a vehicle, which is a moving body, is travelling is often checked in a state in which the vehicle is stopped after its travelling. Therefore, the detachment may be detected not only during a period in which the engine, the power supply or the like of the vehicle is operating but also for a predetermined period such as ten minutes after the engine, the power supply or the like has been turned off. Further, the event recording data based on an event detected while a vehicle, which is a moving body, is parked, is often checked before start of travelling. Therefore, the detachment may be detected for a predetermined period such as ten minutes after, for example, the door is unlocked or passengers get out of the vehicle regardless of whether the engine, the power supply or the like of the vehicle is operated. In any case, the detachment may be detected only when the vehicle is not travelling or the gear or the brake is in the parking state.

In Step S101, the attachment/detachment detection unit 129 determines whether or not the detachment of the recording reproduction apparatus 10 including the display unit 156 has been detected. When the detachment of the recording reproduction apparatus 10 including the display unit 156 has been detected in Step S101 (Step S101: Yes), the reproduction controller 124 determines whether or not there is event recording data that has been stored most recently at a timing when the detachment has been detected (Step S102). The phrase "immediately before at" can be used instead of the phrase "most recently". For example, when it has been detected in Step S101 that the recording reproduction apparatus 10 has been detached, the latest event recording data is referred to as the event recording data that has been stored most recently. Further, when the latest event recording data is, for example, the event recording data stored in the previous day or the event recording data stored before the passage of a period in which the vehicle has not operated for one hour or more, it may be determined in Step S102 that there is no most recent event recording data.

When it has been determined in Step S102 that there is event recording data that has been stored most recently (Step S102: Yes), the reproduction controller 124 starts reproducing the most recent event recording data at the timing when the detachment has been detected (Step S103). Further, in Step S103, erasure of the event recording data that is being reproduced in Step S103 or the event recording data reproduced in Step S103 is restricted or prohibited. The reason why the erasure of the event recording data is restricted is because, during the reproduction of the event recording data, a person often performs reproduction while holding the recording reproduction apparatus 10 including the display unit 156 in his/her hand, and in this state, it is easy for this person to operate the operation unit 155. Therefore, it is required to prevent the event recording data from being erased intentionally or by mistake. While the event recording data whose erasure is to be restricted in Step S103 is the event recording data that is to be reproduced at least in Step S103, erasure of all the pieces of event recording data stored in the recording reproduction apparatus 10 may be restricted. Alternatively, while the recording reproduction apparatus 10 including the display unit 156 is being detached, the erasure of the event recording data by the operation of the operation unit 155 may be restricted.

The reproduction of the event recording data in Step S103 may indicate reproduction of the event recording data that is to be reproduced at least once or a plurality of predetermined number of times or may indicate repeated reproduction thereof until a reproduction stop instruction by the operation unit 155 is accepted.

When it has been determined in Step S102 that there is no event recording data that has been stored most recently (Step S102: No), the process proceeds to Step S105.

After the reproduction of the event recording data has been started in Step S103, the reproduction controller 124 determines whether or not the reproduction of the event recording data has ended (Step S104). In Step S104, it is determined that the reproduction of the event recording data has ended when the predetermined number of times of reproduction of the reproduced event recording data has ended or when the reproduction stop instruction has been accepted.

When it has been determined in Step S104 that the reproduction of the event recording data has ended (Step S104: Yes), the process proceeds to Step S105, where it is determined whether the detachment detection period has ended (Step S105). When it has been determined in Step S104 that the reproduction of the event recording data has not ended (Step S104: No), the processing of Step S104 is performed again.

When the detachment of the recording reproduction apparatus 10 including the display unit 156 has not been detected in Step S101 (Step S101: No), the process proceeds to Step S105.

When it has been determined in Step S105 that a given period in which the detachment of the recording reproduction apparatus 10 including the display unit 156 should be detected has ended (Step S105: Yes), this processing is ended. When it has been determined in Step S105 that the given period in which the detachment of the recording reproduction apparatus 10 including the display unit 156 should be detected has not ended (Step S105: No), the processing of Step S101 is performed.

According to the above processing, by detaching the recording reproduction apparatus 10 including the display unit 156, the event recording data that has been stored most recently is reproduced without any special reproduction operation, whereby it is possible to easily check the event recording data.

When, for example, the user of the vehicle on which the recording reproduction apparatus 10 is mounted is a party who is involved in an accident, even when it is desired to check video images at the time of the accident by operating the recording reproduction apparatus 10 after the occurrence of the accident but the user is unfamiliar with its operation or the user is distracted by the accident, it is possible to easily check video images when the accident occurs. Further, even when a third party who is not involved in the accident needs to check the video at the time of the accident, even without knowledge of the operation of the recording reproduction apparatus 10, it is possible to easily check video images when the accident occurs.

Figure 6:
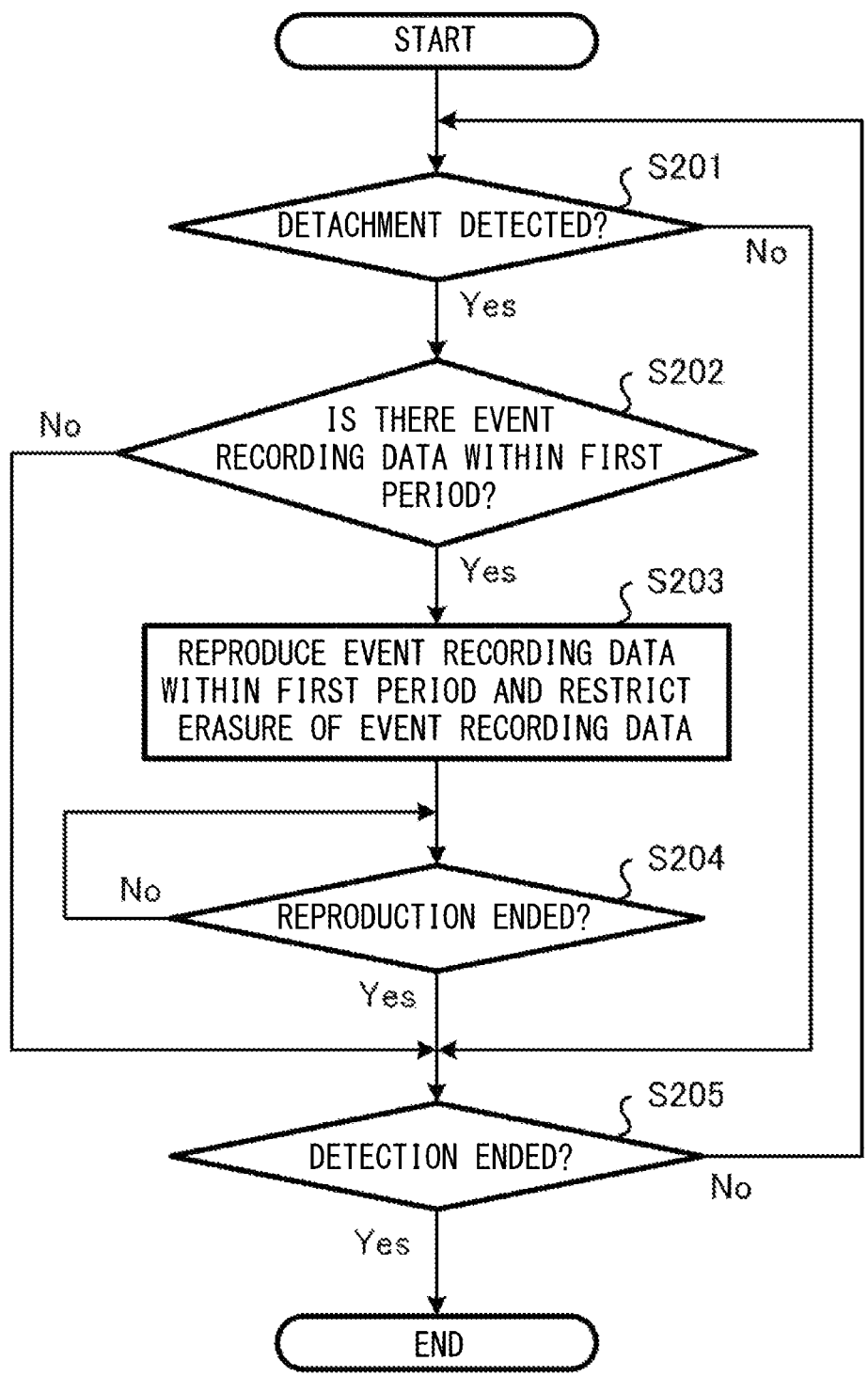
FIG. 6 is a flowchart showing a process example of a recording reproduction apparatus according to a second embodiment of the present disclosure.

Referring next to FIG. 6, a second embodiment of the present disclosure will be described. Since some of the configurations and the processes of the recording reproduction apparatus 10 according to the second embodiment are the same as those of the recording reproduction apparatus 10 according to the first embodiment, the descriptions of the same configurations and processes will be omitted. FIG. 6 is a flowchart describing a case in which the recording reproduction apparatus 10 reproduces event recording data. In FIG. 6, Step S201 is the same as Step S10 in FIG. 5, Step S204 is the same as Step S104 in FIG. 5, and Step S205 is the same as Step S105 in FIG. 5.

When the detachment of the recording reproduction apparatus 10 including the display unit 156 has been detected in Step S201 (Step S201: Yes), the reproduction controller 124 determines whether or not there is event recording data stored within a first period from the timing when the detachment has been detected (Step S202). While the first period is a given period, it is, for example, ten minutes.

The first period in Step S202 may include the following two patterns. One first period is a period when the vehicle is related to an accident and it is desired to check the event recording data after the accident. In this case, the first period may be relatively short and may be, for example, five minutes or ten minutes. In this case, the event detection unit 127 detects acceleration that corresponds to the accident as an event. The other first period is a period for checking occurrence of a dangerous situation such as sudden braking after driving or during breaks while driving. In this case, the first period needs to be relatively long and may be, for example, three hours or ten hours. In this case, the event detection unit 127 detects acceleration that corresponds to sudden braking or the like as an event.

When it has been determined in Step S202 that there is event recording data stored within the first period (Step S202: Yes), the reproduction controller 124 starts reproducing the event recording data stored within the first period from the timing when the detachment has been detected (Step S203). Further, in Step S203, erasure of the event recording data that is being reproduced in Step S203 or the event recording data reproduced in Step S203 is restricted or prohibited.

The reproduction of the event recording data in Step S203 may be reproduction of the event recording data that is to be reproduced once or a plurality of predetermined number of times or may be repeated reproduction thereof until the reproduction stop instruction by the operation unit 155 is accepted. Further, when the first period is the other first period, it is possible that a plurality of pieces of event recording data are stored within the first period. In this case, the plurality of pieces of event recording data are continuously reproduced. When, for example, the plurality of pieces of event recording data are stored within the first period, the reproduction controller 124 reproduces the plurality of pieces of event recording data in order from the event recording data that has been stored at the earliest timing.

When it has been determined in Step S202 that there is no event recording data stored within the first period (Step S202: No), the process proceeds to Step S205.

After the reproduction of the event recording data has been started in Step S203, the reproduction controller 124 determines whether or not the reproduction of the event recording data has ended (Step S204). When a predetermined number of times of reproduction of the reproduced event recording data has ended, when the reproduction of all the pieces of event recording data to be reproduced has ended in Step S204, or when the reproduction stop instruction has been accepted, it is determined that the reproduction of the event recording data has ended.

According to the above processing, by detaching the recording reproduction apparatus 10 including the display unit 156, the event recording data stored within the first period is reproduced without any special reproduction operation, whereby it is possible to easily check the event recording data.

The recording reproduction apparatus 10 according to the second embodiment described with reference to FIG. 6 determines, in Step S202, the presence or the absence of the event recording data stored within a period dated back from the timing when the detachment has been detected in Step S201 by the first period. As a modified example of the second embodiment, the reproduction of the event recording data may be performed when the detachment has been detected within a period of the passage of a second period from the timing when the event has been detected or the timing when the event recording data has been stored, starting from the timing when the event has been detected or the timing when the event recording data is stored. Specific examples of the second period are the same as those of the first period.

Figure 7:
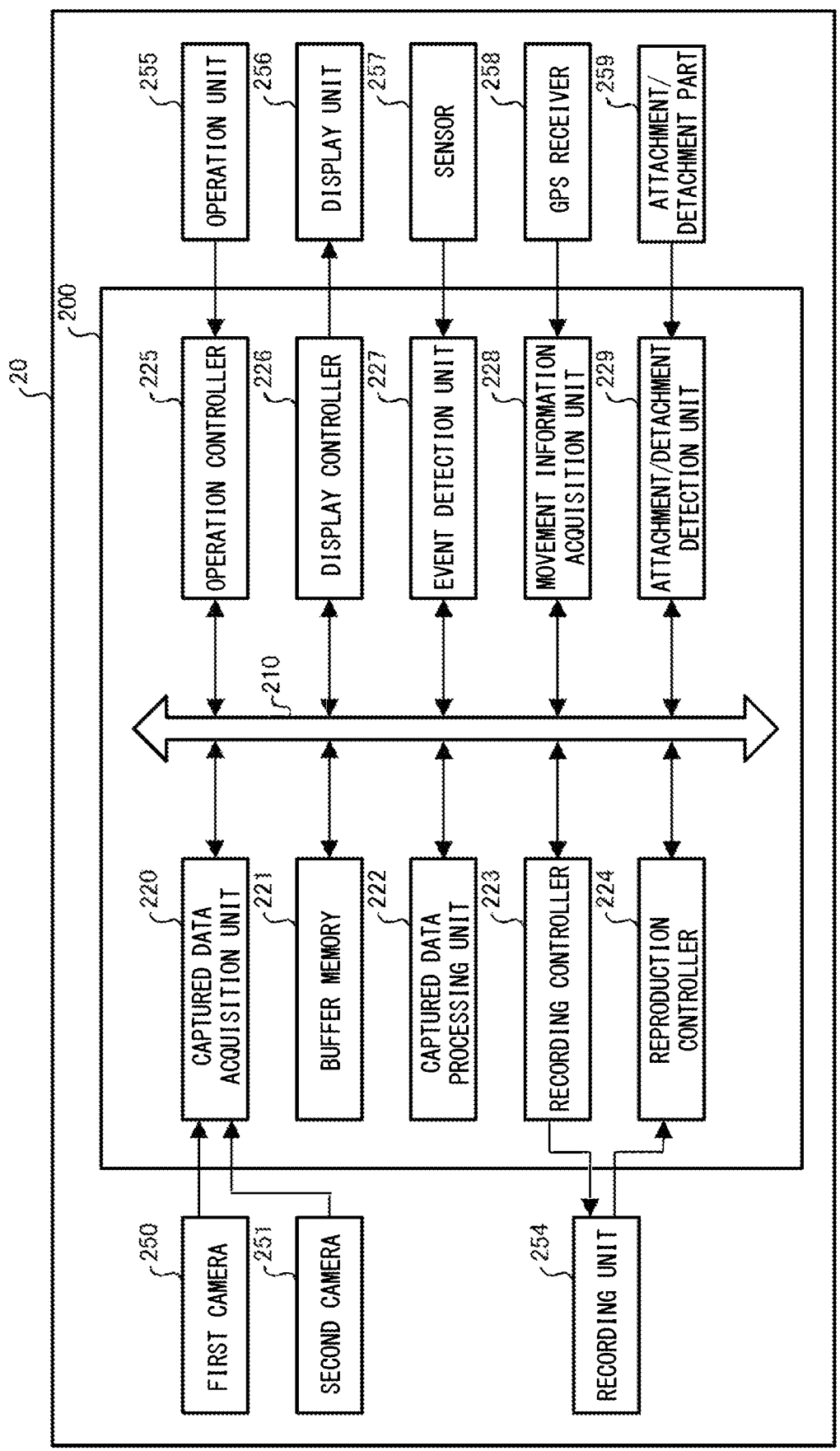
FIG. 7 is a block diagram showing a configuration of a recording reproduction apparatus according to a third embodiment of the present disclosure.
Figure 8A:
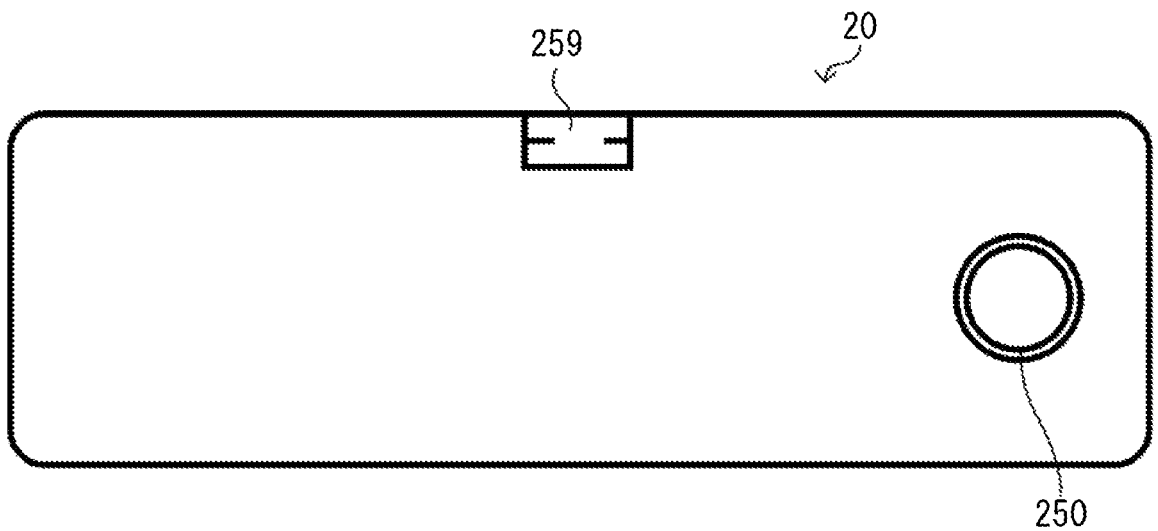
FIG. 8A is a diagram showing the exterior of the recording reproduction apparatus according to the third embodiment of the present disclosure.
Figure 8B:
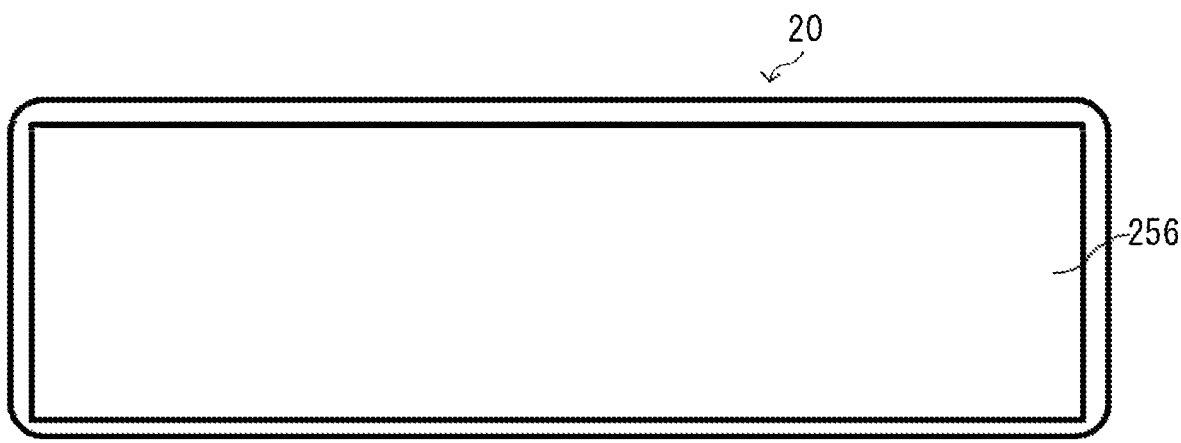
FIG. 8B is a diagram showing the exterior of the recording reproduction apparatus according to the third embodiment of the present disclosure.
Figure 8C:
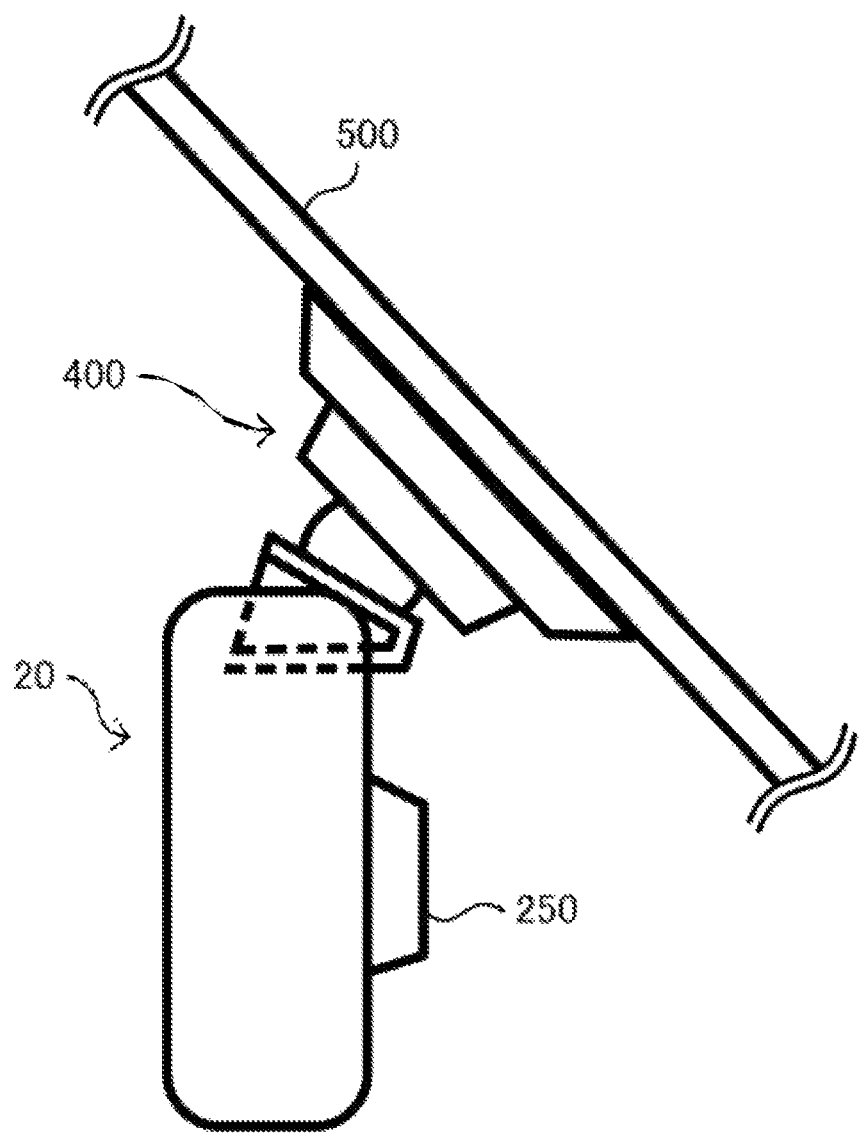
FIG. 8C is a diagram showing the exterior of the recording reproduction apparatus according to the third embodiment of the present disclosure.
Figure 9:
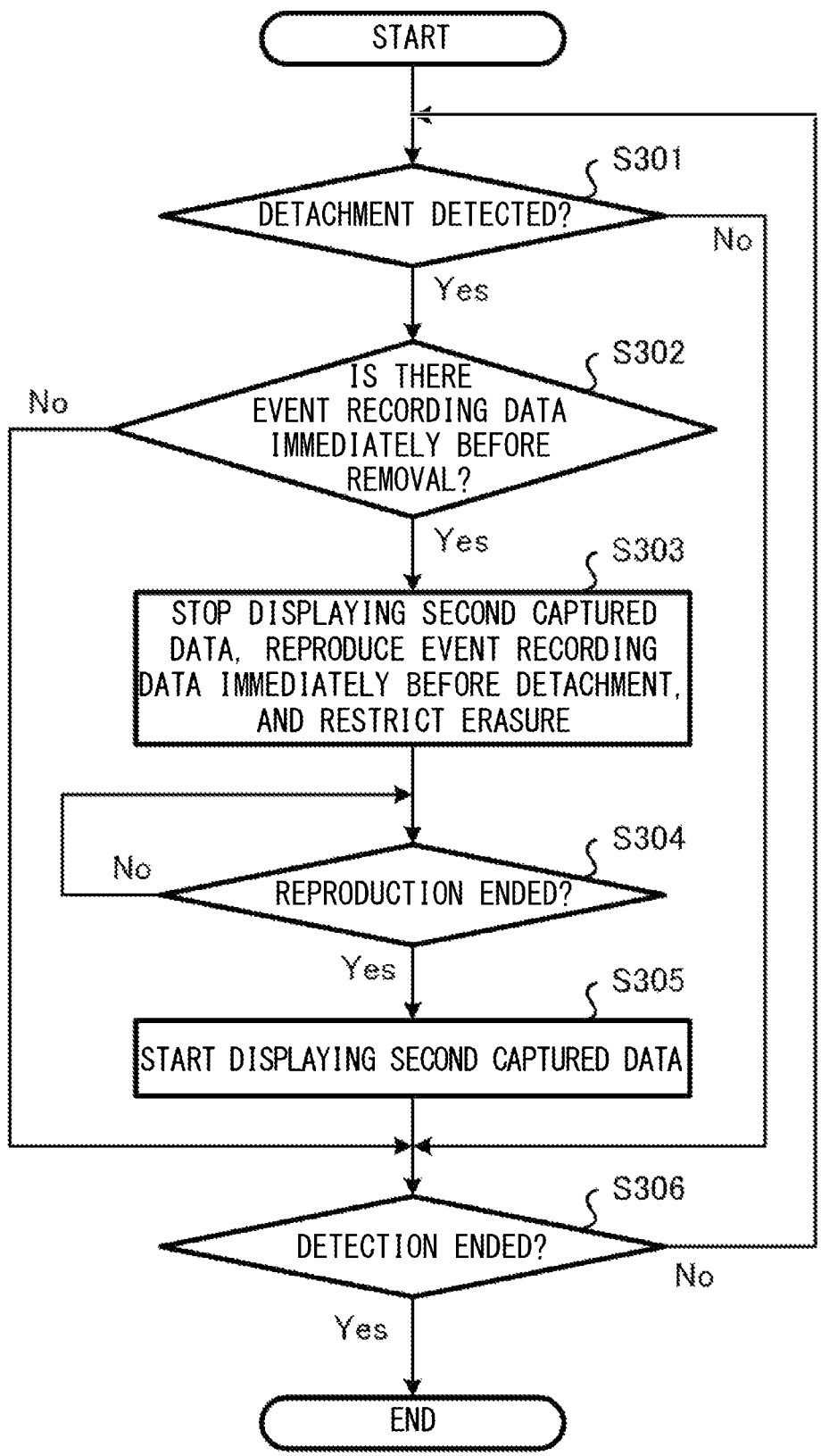
FIG. 9 is a flowchart showing a process example of the recording reproduction apparatus according to the third embodiment of the present disclosure.

Referring next to FIGS. 7 to 9, a third embodiment of the present disclosure will be described. Since some of the configurations and the processes of a recording reproduction apparatus 20 according to the third embodiment are the same as those of the recording reproduction apparatus 10 according to the first embodiment, the descriptions of the same configurations and processes will be omitted. The recording reproduction apparatus 20 according to the third embodiment, which is an electronic mirror that also serves as a dashboard camera, is mounted, for example, above the windshield of the vehicle in a direction in which the front side of the vehicle can be captured in such a way that the driver of the vehicle is able to check the video images of the camera that captures images of the back side of the vehicle using the display unit. Further, the recording reproduction apparatus detects an impact that corresponds to a phenomenon such as an accident that should be detected as an event and stores captured data in a period including the timing when the accident has occurred as the event recording data.

FIG. 7 is a block diagram showing a configuration of the recording reproduction apparatus 20 according to the third embodiment of the present disclosure. The components of the recording reproduction apparatus 20 shown in FIG. 7 whose names are the same as those of the recording reproduction apparatus 10 shown in FIG. 1 serve the same functions although the numbers are different from each other.

The recording reproduction apparatus 20 shown in FIG. 7 further includes, besides a first camera 250, a second camera 251. The configuration of the second camera 251 is similar to that of the first camera 250 and the second camera 251 outputs captured second captured data to the captured data acquisition unit 220. The second camera 251 is included on the back side of the vehicle so that it can capture images of the back side of the vehicle. Therefore, the captured data acquisition unit 220 acquires, besides the first captured data captured by the first camera 250, the second captured data captured by the second camera 251.

In FIG. 7, at least the second camera 251, the captured data acquisition unit 220, the display controller 226, and the display unit 256 compose an electronic mirror. The electronic mirror, which is typically provided with a display unit provided above the windshield of the vehicle, is a device that allows the driver of the vehicle to check the back side of the vehicle. Therefore, the recording reproduction apparatus 20 needs to display the second captured data captured by the second camera 251 on the display unit 256 continuously at least during the operation of the vehicle or while the vehicle is driving.

The captured data acquisition unit 220 may acquire the second captured data via wired connection in which a terminal included in the attachment/detachment unit 259 is connected since the recording reproduction apparatus 20 is mounted on the vehicle or may acquire the second captured data via a radio communication apparatus (not shown) included in the second camera 251 and the recording reproduction apparatus 20.

The display controller 226 causes the display unit 256 to display the second captured data captured by the second camera 251 during a period in which the vehicle is operating. The display controller 226 causes, when there is a request for reproducing the event recording data stored in the recording unit 254, the display unit 256 to display the event recording data reproduced by the reproduction controller 224.

FIGS. 8A-8C are diagrams each showing the exterior of the recording reproduction apparatus 30 according to the third embodiment of the present disclosure. FIG. 8A is a front view of the recording reproduction apparatus 20 when it is seen from the direction in which images of an outside of the vehicle are captured. That is, FIG. 8A is diagram of the recording reproduction apparatus 20 when it is seen from the front of the direction in which the first camera 250 captures images in FIGS. 8A-8C. FIG. 8B is a diagram of the recording reproduction apparatus 20 when it is seen from the back surface. FIG. 8C is a diagram of the recording reproduction apparatus 20 when it is seen from the lateral surface. The driver of the vehicle checks the back side of the vehicle by checking the display unit 256 while driving the vehicle.

Referring next to FIG. 9, a flow of the recording reproduction processing executed by the recording reproduction apparatus 20 will be described. The precondition of FIG. 9 is a state in which the recording reproduction apparatus 20 causes the display unit 256 to display the second captured data, that is, a state in which the recording reproduction apparatus 20 serves as an electronic mirror. Since the configurations and the processes of the recording reproduction apparatus 20 according to the third embodiment are the same as those of the recording reproduction apparatus 10 according to the first embodiment, the descriptions of the same configurations and processes will be omitted. FIG. 9 is a flowchart describing a case in which the recording reproduction apparatus 10 performs reproduction of the event recording data. In FIG. 9, Step S301 is the same as Step S101 in FIG. 5, Step S302 is the same as Step S102 in FIG. 5, Step S304 is the same as Step S104 in FIG. 5, and Step S306 is the same as Step S105 in FIG. 5.

When it has been determined in Step S302 that there is event recording data that has been stored most recently (Step S302: Yes), the reproduction controller 224 stops displaying the second captured data and starts reproduction of the most recent event recording data at a timing when the detachment has been detected (Step S303). Further, in Step S303, erasure of the event recording data that is being reproduce in Step S103 or the event recording data reproduced in Step S103 is restricted or prohibited.

The reproduction of the event recording data in Step S303 may indicate reproduction of the event recording data that is to be reproduced at least once or a plurality of predetermined number of times or repeated reproduction of the event recording data until when the reproduction stop instruction is accepted by the operation unit 255.

When it has been determined in Step S304 that the reproduction of the event recording data has ended (Step S304: Yes), the display controller 226 starts displaying the second captured data (Step S305). That is, the function as the electronic mirror is re-started.

Step S202 in FIG. 6 and its modified example may be applied to the processing of Step S302 in FIG. 9. In this case, the processing of Step S303 stops displaying the second captured data and starts the reproduction of the event recording data within the first period.

According to the above processing, by detaching the recording reproduction apparatus 20 including the display unit 256 that functions as the electronic mirror, the event recording data stored within the first period is reproduced without any special reproduction operation, whereby it is possible to easily check the event recording data.

The display form in the display unit 256 by the display controller 226 in Step S303 may either be a form in which the event recording data is displayed on the entire surface of the display unit 256 in place of the display of the second captured data or a form in which the display of the event recording data may be partially overlapped with the display of the second captured data.

Note that the present disclosure is not limited to the above-described embodiments and may be changed as appropriate without departing from the scope of the present disclosure.

Further, the program for causing a computer to execute the aforementioned processing is stored using various types of non-transitory computer readable media and can be supplied to a computer that operates as a recording reproduction apparatus.

What is claimed is:

1. A recording reproduction apparatus comprising:
   a controller configured to acquire first captured data captured by a first camera that captures an image of an outside of a vehicle;
   a sensor configured to detect an event regarding the vehicle;
   a recording controller configured to store, when the sensor has detected an event, the first captured data in a period including at least a timing of occurrence of the event that has been detected as event recording data; and
   a controller configured to detect an attachment/detachment state of the recording reproduction apparatus to/from the vehicle,
   wherein the recording controller prohibits, while the vehicle is stopped, or within a predetermined period of time from the time when the sensor detects the event, or within a predetermined period of time from the time when the recording controller has stored the event recording data, when it has been detected by the controller that the recording reproduction apparatus has been detached from vehicle deletion of event recording data that has been stored most recently just before a timing when it has been detected that the recording reproduction apparatus has been detached.

2. The recording reproduction apparatus according to claim 1, wherein the recording controller prohibits deletion of event recording data while the recording reproduction apparatus is being removed from the vehicle.

3. The recording reproduction apparatus according to claim 1, further comprising an operation unit configured to accept an operation on the recording reproduction apparatus,
wherein the recording controller prohibits deletion of event recording data by an operation of the operation unit.

4. A recording reproduction apparatus comprising:
a controller configured to acquire first captured data captured by a first camera that captures an image of an outside of a vehicle;
a sensor configured to detect an event regarding the vehicle;
a recording controller configured to store, when the sensor has detected an event, the first captured data in a period including at least a timing of occurrence of the event that has been detected as event recording data;
a reproduction controller configured to reproduce the event recording data stored in the recording controller; and
a controller configured to detect an attachment/detachment state of the recording reproduction apparatus to/from the vehicle,
wherein the recording controller prohibits, while the vehicle is stopped, or within a predetermined period of time from the time when the sensor detects the event, or within a predetermined period of time from the time when the recording controller has stored the event recording data, deletion of event recording data to be reproduced by the reproduction controller when it has been detected by the controller that the recording reproduction apparatus has been detached from the vehicle.

5. The recording reproduction apparatus according to claim 4, wherein the recording controller prohibits deletion of event recording data while the recording reproduction apparatus is being removed from the vehicle.

6. The recording reproduction apparatus according to claim 4, further comprising an operation unit configured to accept an operation on the recording reproduction apparatus,
wherein the recording controller prohibits deletion of event recording data by an operation of the operation unit.

7. A recording reproduction apparatus comprising:
a controller configured to acquire first captured data captured by a first camera that captures an image of an outside of a vehicle;
a sensor configured to detect an event regarding the vehicle;
a recording controller configured to store, when the sensor has detected an event, the first captured data in a period including at least a timing of occurrence of the event that has been detected as event recording data;
a reproduction controller configured to reproduce the event recording data stored in the recording controller;
a display controller configured to cause a display unit to display the event recording data reproduced by the reproduction controller; and
a controller configured to detect an attachment/detachment state of the recording reproduction apparatus to/from the vehicle,
wherein the reproduction controller performs, when it has been detected by the controller that the recording reproduction apparatus has been detached from the vehicle within a predetermined period from the time the sensor has detected the event or within a predetermined period from the time the recording controller has stored event recording data, reproduction of event recording data based on the detected event.

* * * * *